(12) United States Patent
Peterson

(10) Patent No.: US 8,596,864 B2
(45) Date of Patent: *Dec. 3, 2013

(54) DIGITAL OUTPUT TEMPERATURE SENSOR AND METHOD OF TEMPERATURE SENSING

(75) Inventor: Luverne R. Peterson, San Diego, CA (US)

(73) Assignee: Toshiba America Electronic Components, Inc., Irvine, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 13/044,869

(22) Filed: Mar. 10, 2011

(65) Prior Publication Data

US 2011/0158286 A1   Jun. 30, 2011

Related U.S. Application Data

(63) Continuation-in-part of application No. 12/273,031, filed on Nov. 18, 2008.

(51) Int. Cl.
*G01K 7/00* (2006.01)
(52) U.S. Cl.
USPC .......................................... 374/171; 374/170
(58) Field of Classification Search
USPC ......................................................... 374/170
See application file for complete search history.

(56) References Cited

U.S. PATENT DOCUMENTS

| | | | | |
|---|---|---|---|---|
| 5,325,045 | A * | 6/1994 | Sundby | 323/313 |
| 5,933,045 | A * | 8/1999 | Audy et al. | 327/513 |
| 6,008,685 | A * | 12/1999 | Kunst | 327/512 |
| 6,590,372 | B1 * | 7/2003 | Wiles, Jr. | 323/316 |
| 6,795,752 | B1 * | 9/2004 | Zhao et al. | 700/299 |
| 6,847,319 | B1 * | 1/2005 | Stockstad | 341/119 |
| 6,906,902 | B2 * | 6/2005 | Watanabe | 361/103 |
| 7,057,442 | B2 * | 6/2006 | Hwang et al. | 327/538 |
| 7,078,955 | B2 * | 7/2006 | Kim et al. | 327/512 |
| 7,236,048 | B1 * | 6/2007 | Holloway et al. | 327/539 |
| 7,253,598 | B1 | 8/2007 | Doyle et al. | |
| 2004/0036626 | A1 * | 2/2004 | Chan et al. | 340/870.17 |
| 2005/0001670 | A1 * | 1/2005 | Kim et al. | 327/512 |
| 2006/0190210 | A1 | 8/2006 | Mukherjee | |
| 2007/0126471 | A1 * | 6/2007 | Jeong | 326/30 |
| 2007/0195856 | A1 * | 8/2007 | Blom et al. | 374/117 |
| 2007/0286259 | A1 * | 12/2007 | Kwon et al. | 374/170 |

OTHER PUBLICATIONS

Kuijk K, "A Presion Reference Voltage Source", IEEE Journal of Solid-State Circuits, vol. SC-8, No. 3, Jun. 1973.*
Tuthill M., "A Switched-Current, Switched Capacitor Temperature Sensor in 0.6-um CMOS", IEEE Journal of Solid-State Circuits, vol. 33, No. 7, Jul. 1998.*

(Continued)

*Primary Examiner* — Lisa Caputo
*Assistant Examiner* — Nasir U Ahmed
(74) *Attorney, Agent, or Firm* — Tucker Ellis LLP

(57) ABSTRACT

A temperature sensor generates a digital output signal representative of the absolute temperature of the sensor. The sensor includes a first circuit configured to generate a complementary to absolute temperature (CTAT) voltage signal and a second circuit configured to generate a proportional to absolute temperature (PTAT) current signal. A comparator receives the CTAT and PTAT signals and generates a comparison signal based on a comparison between the signals. A converter circuit receives the comparison signal and generates a digital output signal based on the comparison signal. The digital output signal is representative of the temperature of the sensor.

21 Claims, 12 Drawing Sheets

(56) References Cited

OTHER PUBLICATIONS

Kim J., Yang W., Tan H., "A Low-Power 256-Mb SDRAM With an On-Chip Thermometer and Biased Reference Line Sensing Scheme", IEEE Journal of Solid-State Circuits, vol. 38, No. 27, Feb. 2003.*
Office Action dated Dec. 5, 2011, for the related U.S. Appl. No. 12/273,031, filed Nov. 18, 2008.
Maxim; IC Temperature Sensors Find the Hot Spots; Application Note 689: Jan. 31, 2001.
IC Thermal Sensors Simplify Your Design; Sensor Technology and Design Magazine; Nov. 2004.
Digital Temperature Sensors: Help for Hot Boards; Sensor Technology and Design Magazine; Jan. 2004.
A Switched Current, Switched Capacitor Temperature Sensor in 0.6u CMOS. Mike Tuthill, Sep. 1997.
Micropower CMOS Temperature Sensor with Digital Output; A. Bakker & J. Huijsing; IEEE Journal of Solid-State Circuits; vol. 31, No. 7, Jul. 1996.
A Time-to-Digital-Converter-Based CMOS Smart Temperature Sensor; IEEE Journal of Solid State Circuits, vol. 40, No. 8, Aug. 2005.

* cited by examiner

DIGITAL OUTPUT TEMPERATURE SENSOR AND METHOD OF TEMPERATURE SENSING

CROSS-REFERENCE TO RELATED APPLICATIONS

This application is a continuation-in-part application of U.S. patent application Ser. No. 12/273,031, filed Nov. 18, 2008.

FIELD

Embodiments described herein relate generally to electronic circuits for sensing temperature and to methods using electronic circuits for measuring temperature.

BACKGROUND

Electronic circuits have been used to measure temperature. One technique includes comparing the output of a complementary to absolute temperature signal generating circuit with the output signal of a substantially temperature independent or fixed reference voltage circuit. A temperature output signal is generated based on an amount of offset needed to be added to the fixed reference voltage so that the sum of the offset voltage and the reference voltage at a first input of a comparator matches the level of the complementary to absolute temperature signal at the second input of the comparator. Essentially, the output signal is proportional to the amount of offset needed to be added to the fixed reference voltage.

However, the range of the complementary to absolute temperature signal relative to the fixed reference voltage signal is small making such circuits undesirably sensitive to changes such as drifting, etc. in the temperature independent reference voltage circuit. Also, small changes in the fixed reference signal produce inaccurate results.

BRIEF DESCRIPTION OF THE DRAWINGS

The accompanying drawings incorporated in and forming a part of the specification, illustrate several aspects of the example embodiments, and together with the description serve to explain the principles of the embodiments.

DETAILED DESCRIPTION

Throughout this description, the embodiments shown and described should be considered as exemplars, rather than limitations.

According to one embodiment, a digital output temperature sensor comprises a first circuit configured to generate a first signal, the first signal varying complementary to a temperature of the sensor, a second circuit configured to generate a second signal, the second signal varying proportionally to the temperature of the sensor, a comparator operatively associated with the first and second circuits and configured to receive the first and second signals and generate a comparison signal based on a comparison between the first and second signals, and a converter circuit operatively associated with the comparator and configured to receive the comparison signal and generate a digital output signal based on the comparison signal, the digital output signal being representative of the temperature of the sensor. The first circuit is a reference voltage generator circuit including a single series diode configured to generate a complementary to absolute temperature (CTAT) voltage signal as the first signal. The second circuit is configured to generate a proportional to absolute temperature (PTAT) current signal as the second signal. The converter circuit is configured to receive the comparison signal and generate the digital output signal proportional to the temperature of the sensor.

According to another embodiment, a method in a temperature sensor of sensing a temperature comprises generating a first signal varying complementary to a temperature of the sensor, generating a second signal varying proportionally to the temperature of the sensor, generating a comparison signal based on a comparison between the first and second signals, and generating a digital output signal based on the comparison signal, the digital output signal being representative of the temperature of the sensor. The generating the first signal includes generating, using a single series diode, a complementary to absolute temperature (CTAT) voltage signal as said first signal. The generating of the second signal includes generating a proportional to absolute temperature (PTAT) current signal as said second signal. The generating of the digital output signal includes generating the digital output signal proportional to the temperature of the sensor.

Figure 1:
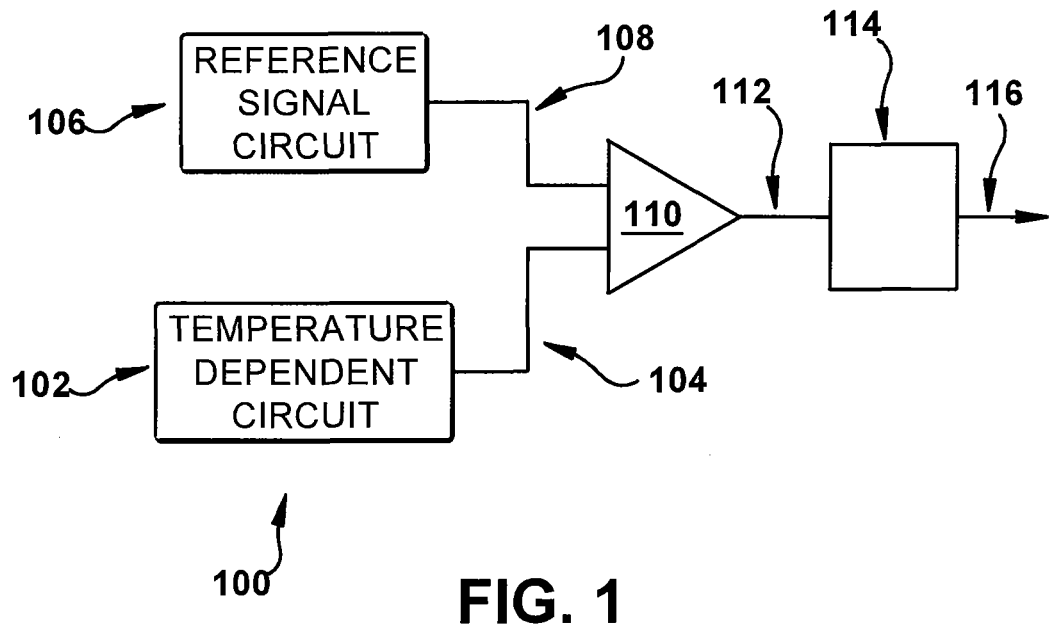
FIG. 1 is a simplified block diagram of a temperature sensing system in accordance with an example embodiment.

With reference first to FIG. 1, a digital output temperature sensor 100 in accordance with an example embodiment is shown in a simplified block diagram form. The digital output temperature sensor 100 includes a temperature dependent circuit 102 configured to generate a first output 104 varying complementary to a temperature of the sensor and a reference signal circuit 106 configured to generate a reference signal 108. A comparator 110 is operatively connected with the temperature dependent circuit 102 and with the reference signal circuit 106, and is configured to receive the first output signal 104 and the reference signal 108 for generating a comparison signal 112 based on a comparison between the first and reference signals 104, 108. In addition, a converter circuit 114 is operatively connected with the comparator 110 and is configured to receive the comparison signal 112 and generate a digital output signal 116 based on the comparison signal 112. The digital output signal 116 is representative of the temperature of the sensor 100.

Figure 2:
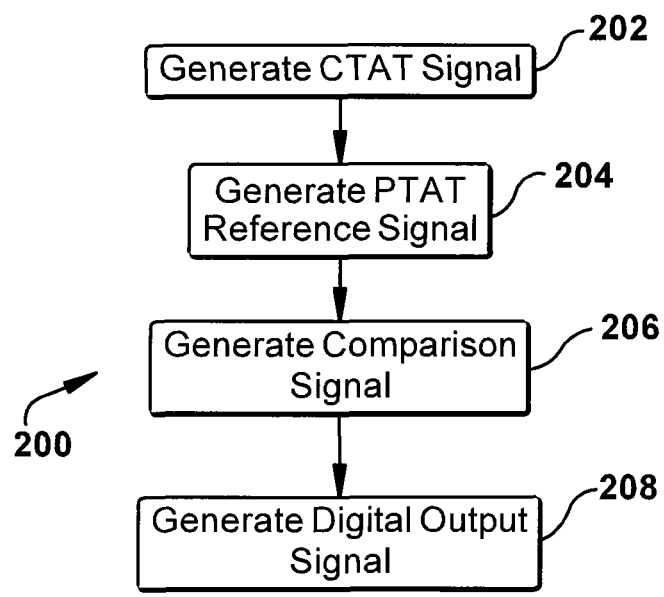
FIG. 2 is a flow diagram showing a method of operating the temperature sensing system of FIG. 1 in an example embodiment.
Figure 3:
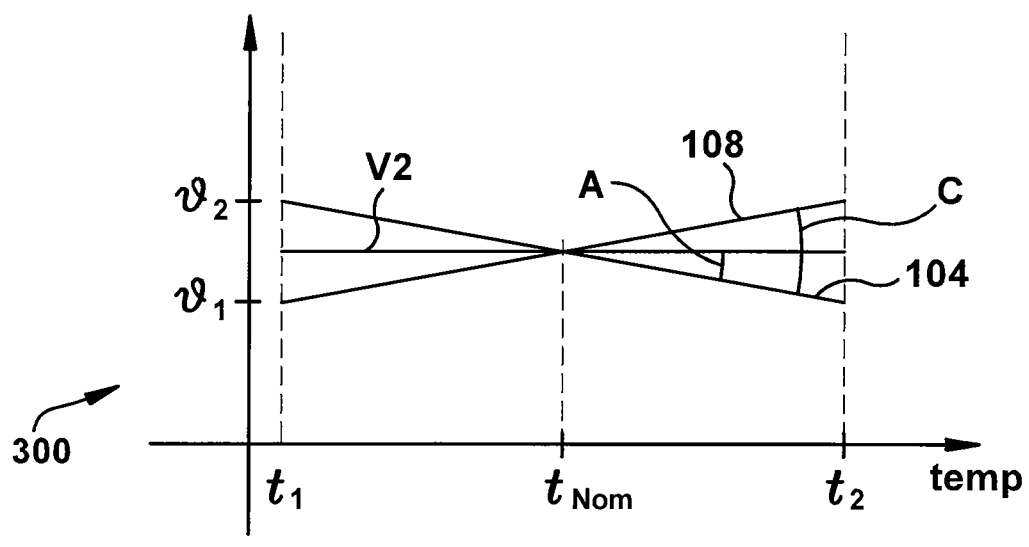
FIG. 3 is a graph showing voltage versus temperature characteristics of the temperature sensing system of FIG. 1 when operated in the mode of FIG. 2.

FIGS. 2 and 3 show a method 200 of operating the sensor 100 and a voltage versus temperature characteristic graph 300, respectively, in accordance with an example embodiment. Although steps are depicted in a particular order in the FIGURES and subsequent flowcharts, it is to be appreciated that the steps can be performed in a different order, overlapping in time or, in a preferred embodiment, simultaneously. The method 200 includes a step of generating 202 a complementary to absolute temperature (CTAT) voltage signal 104 using the temperature dependent circuit 102. In an embodiment, preferably, the temperature dependent circuit 102 includes a diode for generating the enhanced CTAT voltage signal in a manner to be described in greater detail below. Using the reference signal circuit 106, a temperature dependent reference signal 108 is generated at step 204. In this embodiment, preferably, the reference signal 108 varies proportionally to the absolute temperature (PTAT) of the sensor 100. In step 206, using the comparator 110, a comparison signal 112 is generated based on a comparison between the CTAT voltage signal 104 and the PTAT reference signal 108. A digital output signal 116 representative of the temperature of the sensor 100 is generated at step 208 based on the comparison signal.

As shown best in FIG. 3, in general, the CTAT voltage signal 104 varies substantially linearly with changes in temperature and, more particularly, decreases for temperature increases. The negative slope of the CTAT voltage signal 104 of this embodiment is about 200-300 mV over about 150° C. or about −1.6 mV/° C. However, the PTAT reference signal 108 varies substantially linearly with changes in temperature and, more particularly, increases with temperature increases. The positive slope of the PTAT reference voltage signal 106 of this embodiment is about 200-300 mV over about 150° C. or about +1.6 mV/° C.

FIG. 3 further shows the PTAT reference signal 108 overlaid with the standard fixed reference voltage signal V2 of the prior art. As can be seen, in the illustrated prior art example, the temperature circuit 100 is operational substantially in the region of a box bounded by $v_1$, $v_2$, $t_1$, and $t_2$. However, in accordance with this embodiment of the present application, the temperature sensor has enhanced sensitivity and robustness because the angle of incidence C between the CTAT voltage signal 104 and the PTAT reference voltage signal 108 is significantly greater than the angle of incidence A in the prior art between the temperature dependent CTAT voltage signal and the fixed reference voltage V2. Again, this provides an improved sensitivity in the subject temperature sensor 100 and enhances its robustness for use in a wide range of applications.

Figure 4:
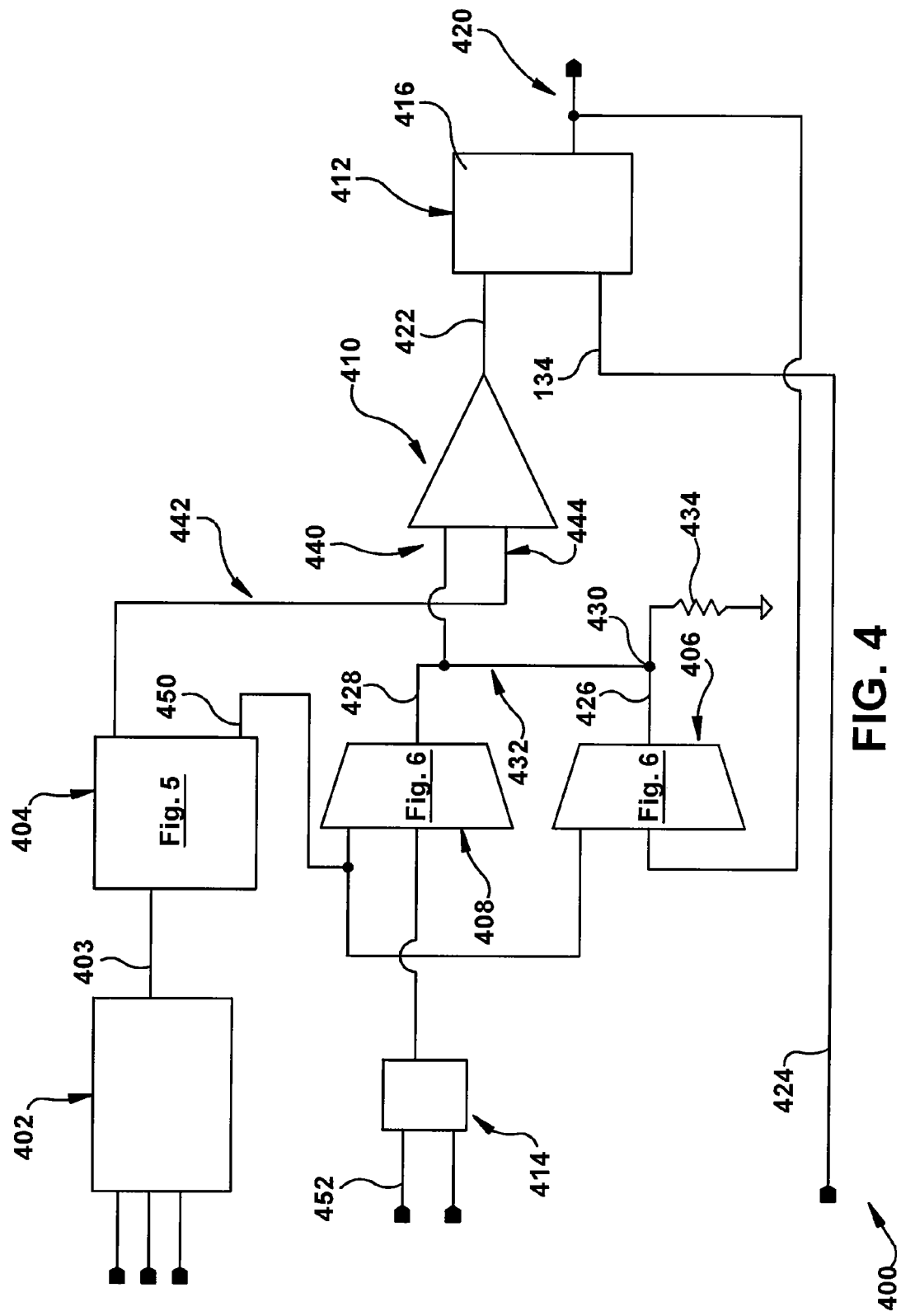
FIG. 4 is a circuit diagram of the temperature sensing system in accordance with an example embodiment.

FIG. 4 is a circuit diagram showing a digital output temperature sensor circuit 400 in accordance with an example embodiment. Turning now to FIG. 4, the sensor circuit 400 includes a low drop out power supply voltage regulator circuit 402 generating a power supply voltage signal 403, a reference voltage generator circuit 404, a pair of digital to analog converters (DACs) 406, 408, a comparator circuit 410, a counter circuit 412, and a latch circuit 414. Preferably, the DACs 406, 408 are identical or at least matched to have complimentary characteristics, behaviors, and function over the operating band.

In the embodiment illustrated, the counter circuit 412 is preferably a 6 bit up/down counter circuit 416 configured to generate a 6 bit digital output 420 based on counting up actions and counting down actions responsive to a pair of inputs received including an input from the comparator circuit 410 in the form of an up/down command signal 422 and a clock signal 424 received into the circuit 400 from an operatively associated external clock source (not shown). Essentially, the 6 bit digital output 420 is proportional to the temperature of the circuit. Preferably, the circuit is operable in a temperature range of −30° C. to +135° C. Thus, the resolution of the circuit in the example embodiment is about 2.5° C./LSB.

The 6 bit digital output signal 420 is configured to provide a digital feedback loop servicing a first DAC 406 for converting the digital signal 420 into a current output signal 426 at a node 430. The current output signal 426 is added together with a similar current output signal 428 originating from the second DAC 408 at the node 430 acting as a summing junction and the combined currents are converted into a feedback voltage signal 432 by a grounded resistor 434. In that way, the feedback voltage signal 432 may be presented at a first input 440 of the comparator 410.

At the digital level of the circuit 400, a first CTAT low voltage signal 442a for low (1.5 volt) circuits and a second CTAT high voltage signal 442b (FIG. 5) for high (2.5 volt) circuits is generated by the reference voltage generator circuit 404 in a manner to be described in greater detail below. It has been found that, in general, the CTAT low voltage signal 442a in conjunction with low voltage (1.5 volt) circuit operation offers more precision than the CTAT high voltage signal 442b in conjunction with high voltage (2.5 volt) circuit operation and, further, is best used with corresponding low voltage DACs 406, 408 for an overall precise temperature sensing circuit 400 having high fidelity over a wide usable temperature range. In the example embodiment illustrated, the CTAT voltage signal 442a is compared at the second input 444 of the comparator 410 with the feedback voltage signal 432 at the first input 440 of the comparator 410. The up/down command signal 422 is generated based upon the comparison. In its preferred form, the up/down command signal 422 is a logical "1" when the CTAT voltage signal 442 is greater than the feedback voltage signal 432 and is a logical "0" when the CTAT voltage signal 442 is less than the feedback voltage signal 432. The counter circuit counts up or down accordingly.

It is to be appreciated, however, that in accordance with an example embodiment, the CTAT voltage signal 442 is compared against a PTAT reference signal rather than against a fixed reference voltage for improved accuracy and range of operation such as described above. In that regard, the reference voltage generator circuit 404 is configured to generate a PTAT reference signal 450 for use by the first and second DACs 406, 408 during their respective conversions of their digital inputs to current outputs. Essentially, the PTAT reference signal 450 biases the DACs 406, 408 to inherently include a temperature dependent characteristic in their respective current outputs. The PTAT reference signal 450 is used to set the currents in the DACs 406, 408 in a manner to be described in greater detail below.

The second DAC 408 and the latch circuit 414 also comprise part of the digital feedback loop of the circuit 400. In its preferred form, the latch is a standard cell Q-latch for latching a digital offset signal 452 into the second DAC 408. The digital offset signal 452 is converted by the DAC to the current output signal 428 mentioned above. Thus, an offset current contribution originating from the second DAC 408 is added to the feedback results at the node 430 and the combined currents are converted into a feedback voltage signal 432 by the grounded resistor 434. In that way, the feedback voltage signal 432 presented at a first input 440 of the comparator 410 may include a user selectable offset value as necessary or desired.

Figure 5:
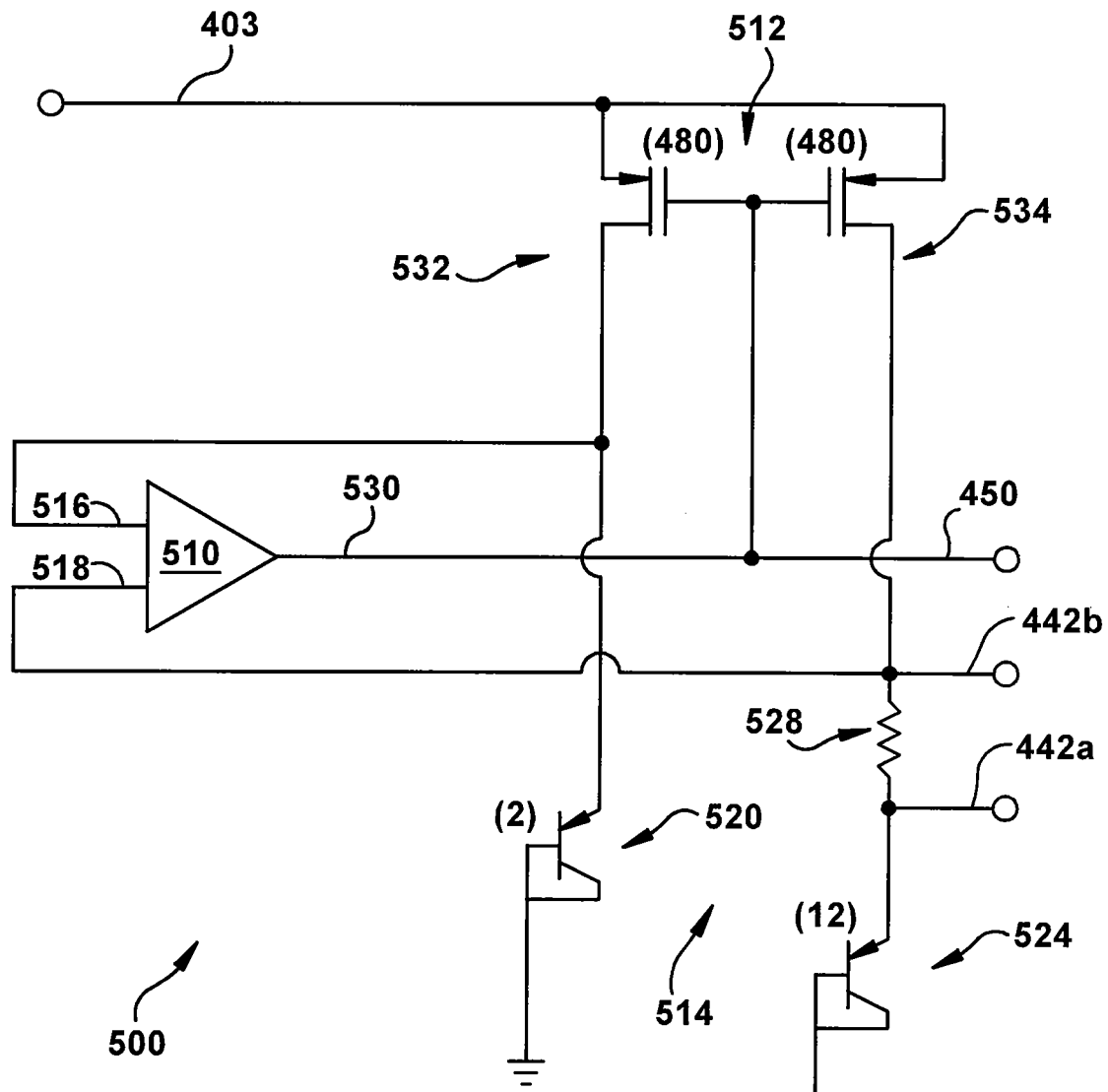
FIG. 5 is a detailed circuit diagram showing components of a portion of the circuit of FIG. 4 in accordance with an example embodiment.

FIG. 5 is a more detailed circuit diagram of the circuit 404 of FIG. 4 in the form in an example embodiment of a reference voltage generator circuit 500 configured to generate the CTAT low voltage signal 443a for the first input 444 of the comparator 410, the CTAT high voltage signal 442b, and the PTAT reference signal 450 for use by the first and second DACs 406, 408 in setting their respective currents. The circuit 500 includes an op amp 510, a set of control P-type transistors 512 and a set of diode-connected PNP transistors 514. In one embodiment, the op amp 510 is a folded cascade op amp. In the example embodiment, the diode-connected PNP transistors 514 are each connected in series between the set of control P-type transistors 512 and the circuit ground.

In one example embodiment, the circuit operates in a bandgap mode of operation. In that regard, the $V_{be}$ threshold voltage of a first bipolar transistor 520 is communicated to a first input 516 of the op amp 510 and the $V_{be}$ threshold voltage of a second bipolar transistor 524 combined with the voltage developed across a resistor 528 is communicated to a second input 518 of the op amp 510. The output signal 530 of the op amp 510 is communicated to first 532 and second 534 matched current sources formed by the set of control P-type transistors 512. It is to be appreciated that although the first and second bipolar transistors 520, 524 are referred to as single devices, they are, in the example embodiment sets of several physical transistors connected and operating in parallel. In this regard, in the example embodiment, the first bipolar transistor 520 is a set of two (2) bipolar transistors connected in parallel, each being a single transistor in series between the first current sources 532 and the circuit ground. Similarly, in the example embodiment, the second bipolar transistor 524 is a set of twelve (12) bipolar transistors connected in parallel, each being a single transistor in series between the second current sources 534 and the circuit ground.

The op amp 510 attempts to establish an output wherein the first and second input signals 516, 518 are equal by varying the output signal 530. When the first and second input signals 516, 518 are controlled to match, the output signal 530 is proportional to the absolute temperature of the circuit 500 and of the sensor system 400. In an embodiment, the output PTAT signal 530 is also used as an input 450 to control the currents flowing in the first and second DACs 406, 408 in a manner to be described in greater detail below. The $V_{be}$ threshold voltage of the second bipolar transistor 524 in series combined with the resistor 528 forms an output signal 442 varying complementary to a temperature of the sensor. Essentially, a CTAT voltage signal 442 is generated. An enhanced stable linear CTAT voltage signal is generated because in the embodiment illustrated, a set of twelve (12) parallel diodes is used to generate the CTAT voltage signal. In one example embodiment, a first set of twelve (12) parallel grounded emitter PNP transistors 524 is used and further in series with a resistor 528 to generate the CTAT voltage signal 442 as shown.

Figure 6:
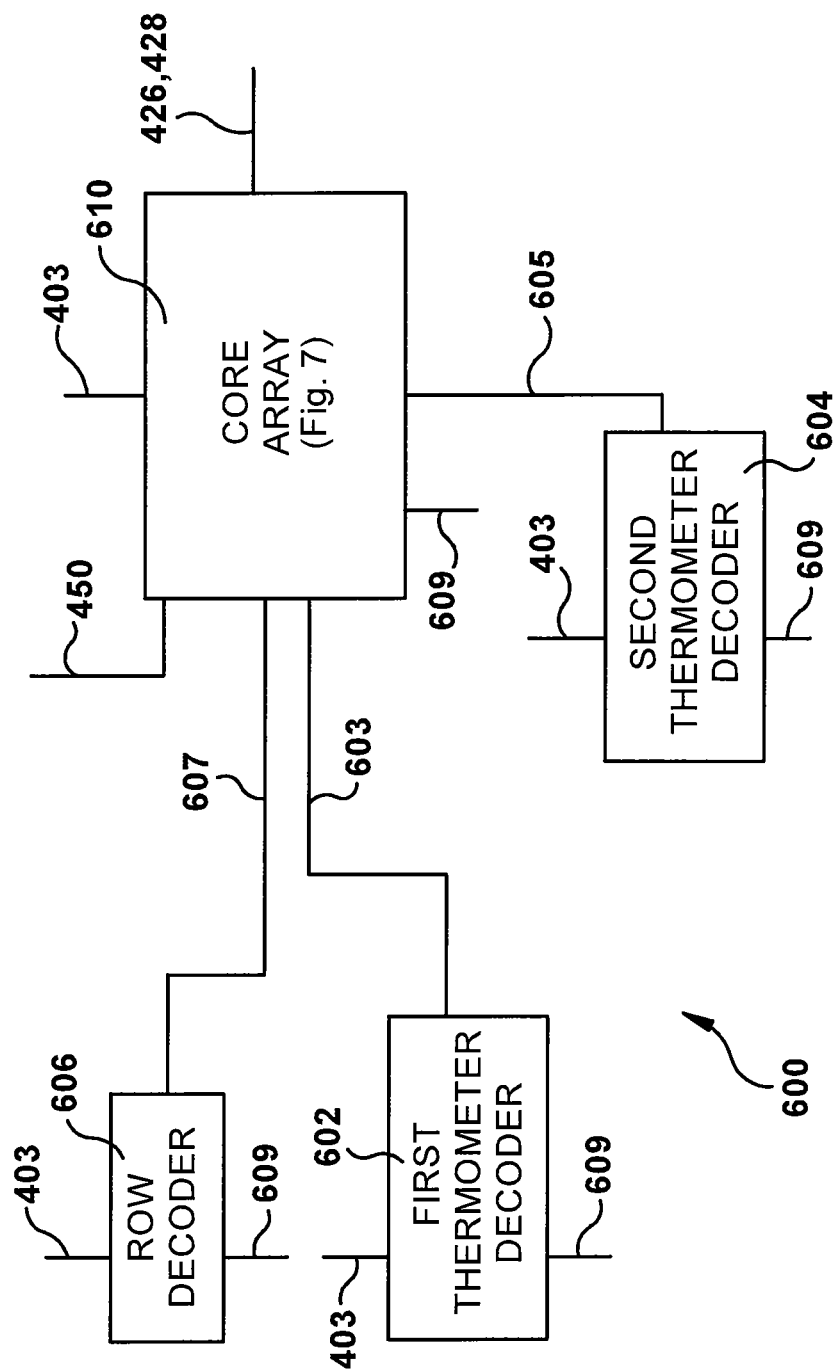
FIG. 6 is a detailed circuit block diagram showing components of another portion of the circuit of FIG. 4

FIG. 6 shows an example digital to analog (DAC) circuit 600 provided in each of the DACs 406, 408 described above. The DAC circuit 600 includes a first thermometer decoder 602 for turning on the rows in a core array 610 using a signal 603, a second thermometer decoder 604 for turning on the columns in the core array 610 using a signal 605, and a row decoder 606 generating a row decoder signal 607 for decoding rows in the core array 610. Each of the first and second thermometer decodes 602, 604, the row decoder 606 and the core array receive power from a power signal 609 such as shown. In addition, as shown, the core array 610 is configured to receive the PTAT reference signal 450.

Figure 7:
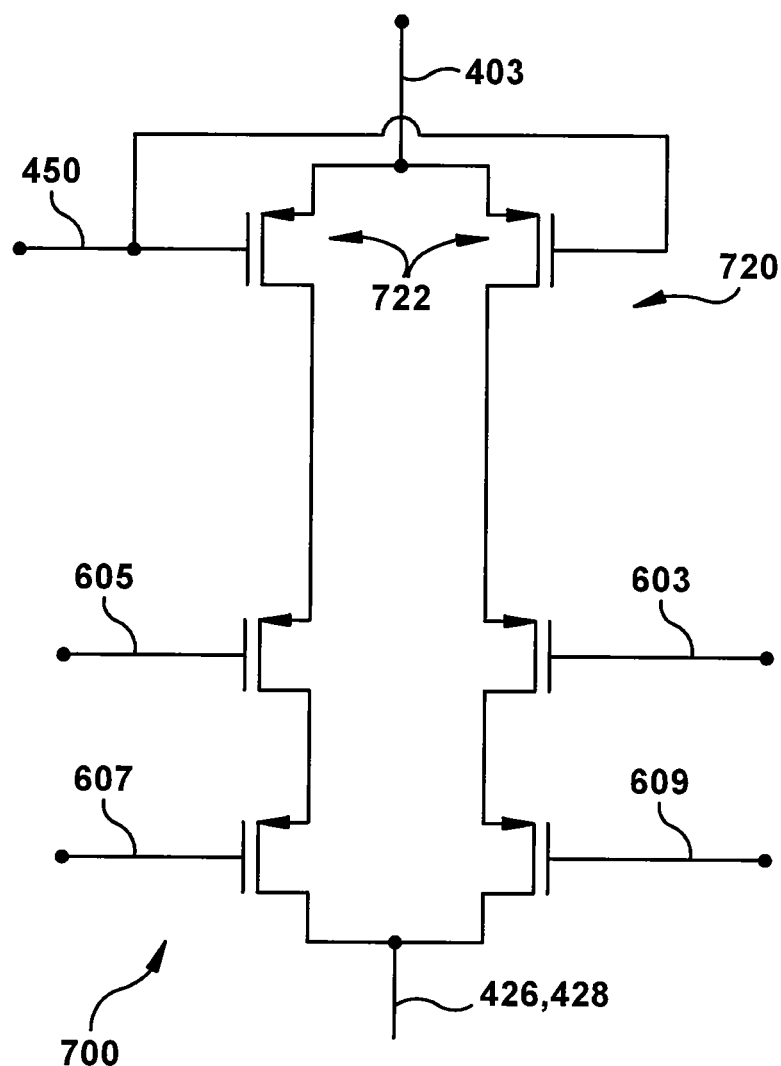
FIG. 7 is a detailed circuit diagram showing components of the core array of FIG. 6.

FIG. 7 is a diagram showing details of a circuit 700 including a set of transistors 720 used in the core array 610 of FIG. 6. A first pair of transistors 722 is connected in parallel and is controlled by the PTAT reference signal 450. In one embodiment, all of the transistors shown in the Figure function as cascode $V_{ds}$ controlled transistors and, in the configuration shown, use the PTAT reference signal 450 to set the partial currents in the core array 610 so that the respective current output signals 426, 428 presented at node 430 (FIG. 4) is a signal proportional to the temperature of the sensor. However, in another embodiment, linearity of the DACs 406, 408 over a temperature range is improved in accordance with further example embodiments by selectively adjusting a length or width or length and width of the first pair of transistors 722 during the fabrication of the DACs 406, 408 of the subject circuit 400. In one preferred embodiment, the length of the transistors used in the core array is controlled to affect a better control of the current per bit of the core array 610. Specifically, the length of the first pair of transistors 722 is varied from a standard length of about 800 nm. Each of the first set of transistors 722 has a nominal width of about 4 um.

Figure 12:
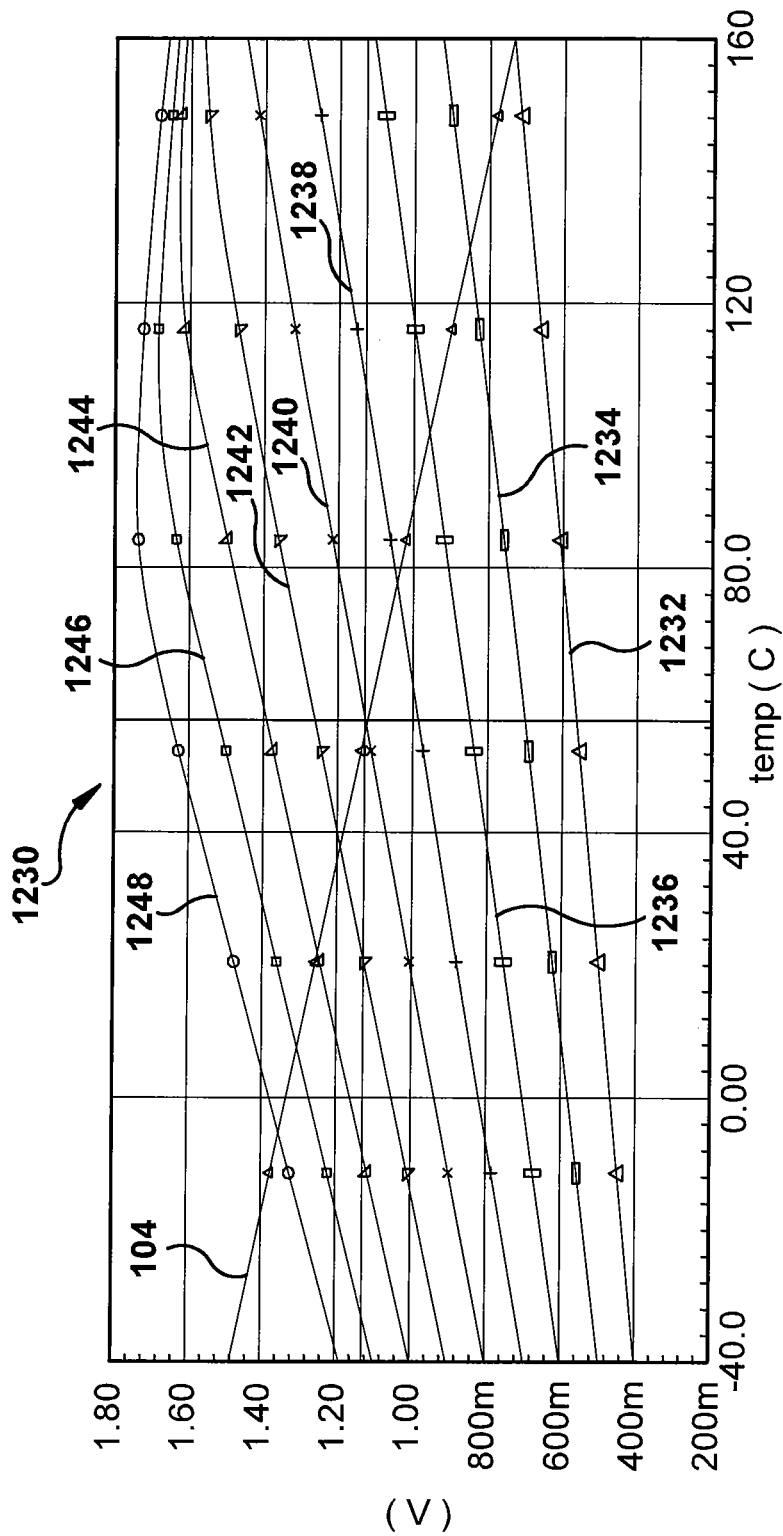
FIG. 12 is a graph showing performance characteristic curves for an uncompensated DAC.
Figure 13:
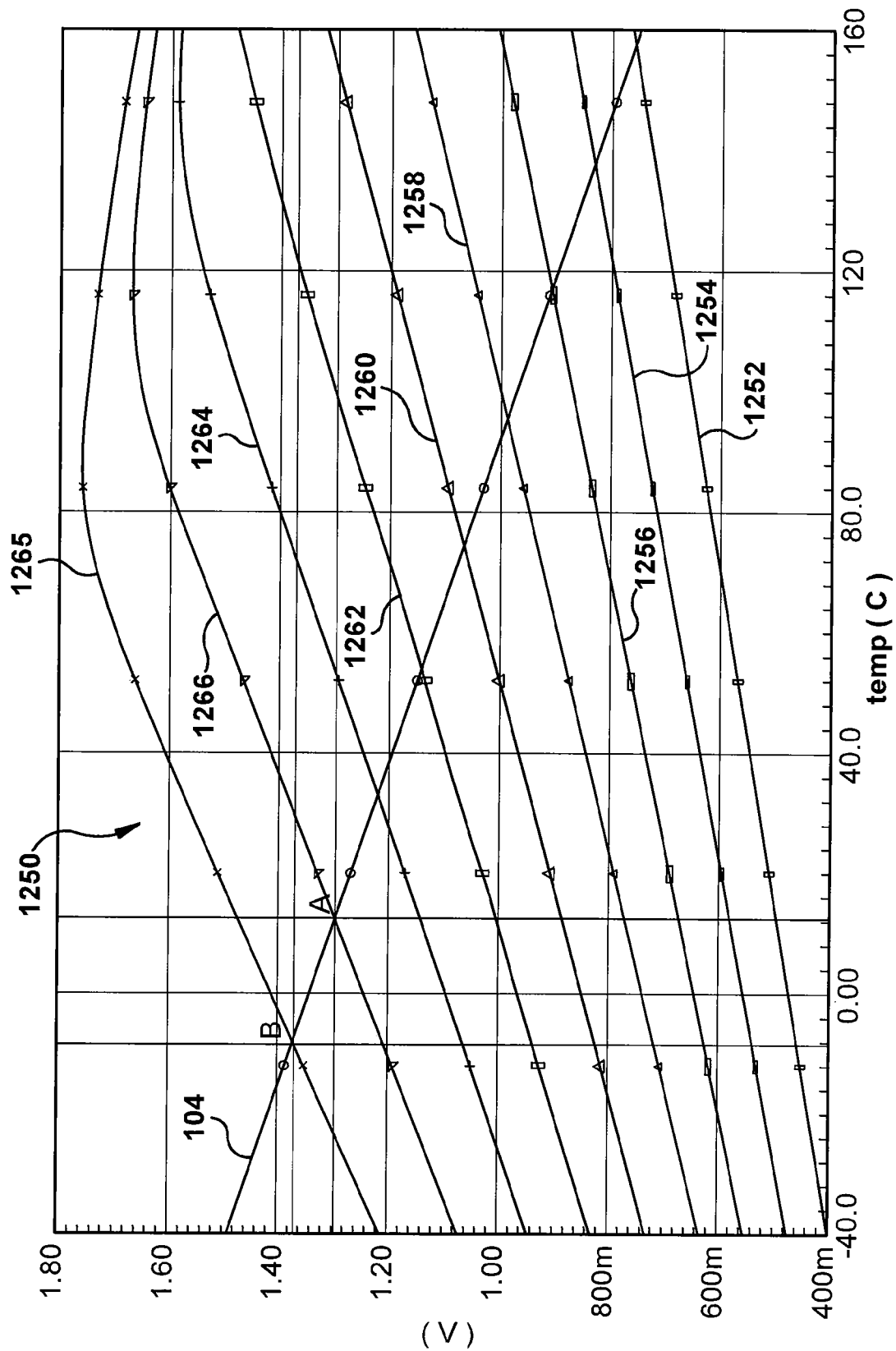
FIG. 13 is a graph showing performance characteristic curves for a compensated DAC.

In one preferred embodiment the length of the current source transistors 722 are varied from about 1.3 um for high temperature operating conditions of the sensor to about 0.45 um for low temperature operating conditions to produce a more uniform 2.5° C. temperature delta per output code change such as, for example, an output code change from 000000 to 000001 representing a temperature change from 152.5° C. to 150.0° C. At high temperatures the current change and reference voltage is preferably less than nominal thus the DAC current source transistors that are turned on for the high temp need to be longer to reduce the current sourced through the transistors. Conversely, for the low temperature operating regions, the current change and reference voltage is preferably greater than nominal thus the DAC current source transistors that are turned on for the low temperature are preferably shorter to increase the current sourced through the transistors. In a DAC circuit having current sources with a uniform length, the change in temperature per code change at the high temperatures would be about 1.5° C. and the temperature per code change for low temperatures would be about 3.5° C. This is due to the change in slope of the PTAT voltages versus the number of active current sources wherein a representative uniform current source length representative performance characteristic is shown in FIG. 12 and a varied current source length representative performance characteristic is shown in FIG. 13. It is to be appreciated that the width of the current source transistors 722 may be varied while holding the lengths thereof substantially fixed or uniform throughout the array, or both the lengths and widths may be varied as desired or necessary to achieve the above described effects.

Figure 8:
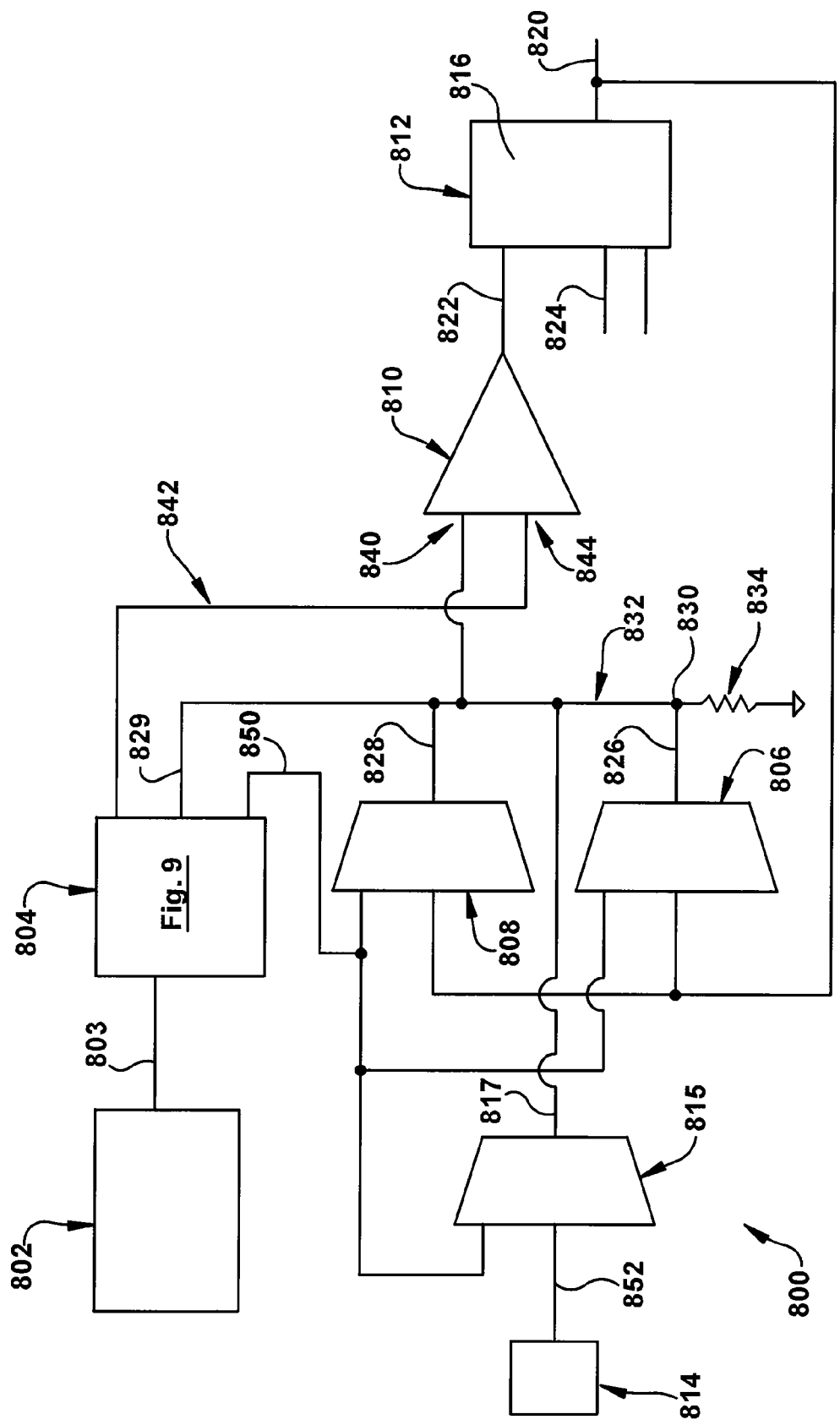
FIG. 8 is a circuit diagram of the temperature sensing system in accordance with a further example embodiment.

FIG. 8 is a circuit diagram showing a digital output temperature sensor circuit 800 in accordance with a further example embodiment. Turning now to FIG. 8, the sensor circuit 800 includes a low drop out power supply voltage regulator circuit 802 generating a power supply voltage signal 803, a reference voltage generator circuit 804, a pair of digital to analog converters (DACs) 806, 808, a comparator circuit 810, a counter circuit 812, a latch circuit 814, and an adjustment digital to analog converter (DAC) 815. Preferably, the DACs 806, 808 are 6-bit converters and are further preferably identical or at least matched to have complimentary characteristics, behaviors, and function over the operating band. The DAC 815 is a 3-bit digital to analog converter in the example embodiment illustrated having eight (8) current level outputs.

In the embodiment illustrated, the counter circuit 812 is preferably a 6 bit up/down counter circuit 816 configured to generate a 6-bit digital output 820 based on counting up actions and counting down actions responsive to a pair of inputs received including an input from the comparator circuit 810 in the form of an up/down command signal 822 and a clock signal 824 received into the circuit 800 from an operatively associated external clock source (not shown). Essentially, the 6-bit digital output 820 is proportional to the temperature of the circuit. Preferably, the circuit is operable in a temperature range of −30° C. to +135° C. Thus, the resolution of the circuit in the example embodiment is about 2.5° C./LSB.

The 6-bit digital output signal 820 is configured to provide a digital feedback loop servicing both the first and second DACs 806 and 808 for converting the digital feedback 420 into current output signals 826 and 828, respectively, which are summed at a node 830. The current output signal 826 originating from the first DAC 806 is added together with a similar current output signal 828 originating from the second DAC 808 and with an offset current signal 829 originating from the reference voltage generator circuit 804 and further with an adjustment signal 817 originating from the adjustment DAC 815 at the node 830 whereat the combined currents are converted into a feedback voltage signal 832 by a grounded resistor 834. In that way, the feedback voltage signal 832 may be presented at a first input 840 of the comparator 810.

At the digital level of the circuit 800, a first CTAT low voltage signal 842a for low (1.5 volt) circuits and a second CTAT high voltage signal 842b (FIG. 9) for high (2.5 volt) circuits is generated by the reference voltage generator circuit 804 in a manner to be described in greater detail below. It has been found that, in general, the CTAT low voltage signal 842a in conjunction with low voltage (1.5 volt) circuit operation offers more precision than the CTAT high voltage signal 842b in conjunction with high voltage (2.5 volt) circuit operation and, further, is best used with corresponding low voltage DACs 806, 808 for an overall precise temperature sensing circuit 400 having high fidelity over a wide usable temperature range. In the example embodiment illustrated, the CTAT low voltage signal 842a is compared at the second input 844 of the comparator 810 with the feedback voltage signal 832 at the first input 840 of the comparator 810. The up/down command signal 822 is generated based upon the comparison. In its preferred form, the up/down command signal 822 is a logical "1" when the CTAT voltage signal 842 is greater than the feedback voltage signal 832 and is a logical "0" when the CTAT voltage signal 842 is less than the feedback voltage signal 832. The counter circuit counts up or down accordingly.

It is to be appreciated, however, that in accordance with an example embodiment, the CTAT voltage signal 842 is compared against a PTAT reference signal rather than against a fixed reference voltage for improved accuracy and range of operation such as described above. In that regard, the reference voltage generator circuit 804 is configured to generate a PTAT reference signal 850 for use by the first and second DACs 806, 808 during their respective conversions of their digital inputs to current outputs. Essentially, the PTAT reference signal 850 biases the DACs 806, 808, and 815 to inherently include a temperature dependent characteristic in their respective current outputs. The PTAT reference signal 850 is used to set the currents in the DACs 806, 808 in a manner to be described in greater detail below.

The adjustment DAC 815 and the latch circuit 814 also comprise part of the digital feedback loop of the circuit 800. In its preferred form, the latch is a standard cell Q-latch for latching a digital offset signal 852 into the offset DAC 815. The digital offset signal 852 is converted by the DAC 815 to a current output signal 817 mentioned above. Thus, an offset contribution originating from the offset DAC 815 is added to the feedback results at the node 830 and the combined currents are converted into a feedback voltage signal 832 by the grounded resistor 834. In that way, the feedback voltage signal 832 presented at a first input 840 of the comparator 810 may include a user selectable offset value as necessary or desired.

Figure 9:
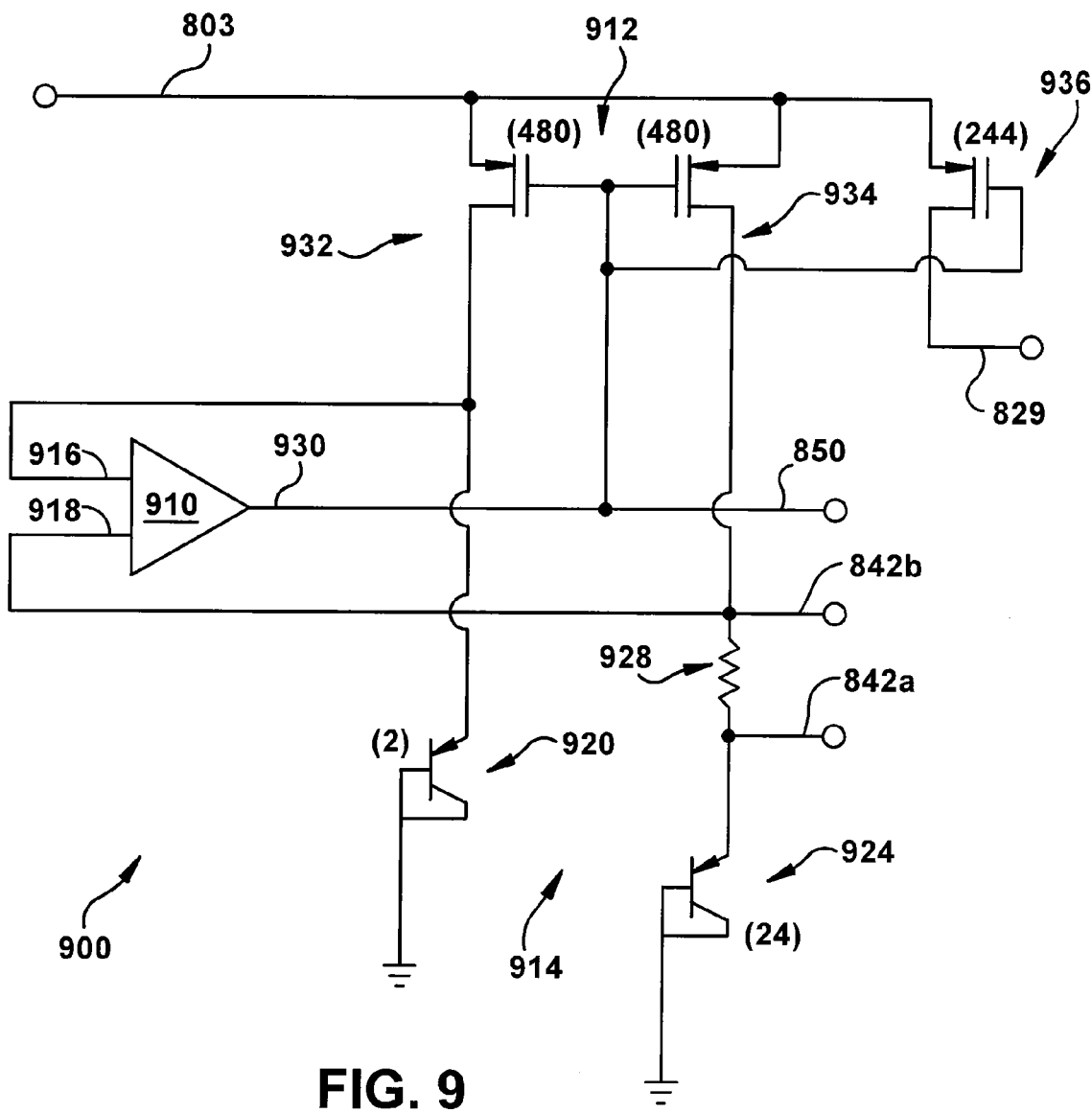
FIG. 9 is a detailed circuit diagram showing components of a portion of the circuit of FIG. 4 in accordance with an example embodiment.

FIG. 9 is a more detailed circuit diagram of the circuit 804 of FIG. 8 in the form in an example embodiment of a reference voltage generator circuit 900 configured to generate the CTAT low voltage signal 842a and the CTAT high voltage signal 842b for use in the alternative at the first input 844 of the comparator 810, the additional current bias signal 829, and the PTAT reference signal 850 for use by the first and second DACs 806, 808 and the offset DAC 815 in setting their respective currents. The circuit 900 includes an op amp 910, a set of control P-type transistors 912, a set of diode-connected PNP transistors 914, and a further set of P-type transistors 936. In one embodiment, the op amp 910 is a folded cascade op amp. In the example embodiment, the diode-connected PNP transistors 914 are each connected in series between the set of control P-type transistors 912 and the circuit ground.

In one example embodiment, the circuit operates in a bandgap mode of operation. In that regard, the $V_{be}$ threshold voltage of a first bipolar transistor 920 is communicated to a first input 916 of the op amp 910 and the $V_{be}$ threshold voltage of a second bipolar transistor 924 combined with the voltage developed across a resistor 928 is communicated to a second input 918 of the op amp 910. The output signal 930 of the op amp 910 is communicated to first 932 and second 934 matched current sources formed by the set of control P-type transistors 912. It is to be appreciated that although the first and second bipolar transistors 920, 924 are referred to as single devices, they are, in the example embodiment sets of several physical transistors connected and operating in parallel. In this regard, in the example embodiment, the first bipolar transistor 920 is a set of two (2) bipolar transistors connected in parallel, each being a single transistor in series between the first current sources 932 and the circuit ground. Similarly, in the example embodiment, the second bipolar transistor 924 is a set of twenty-four (24) bipolar transistors connected in parallel, each being a single transistor in series between the second current sources 934 and the circuit ground.

The op amp 910 attempts to establish an output wherein the first and second input signals 916, 918 are equal by varying the output signal 930. When the first and second input signals 916, 918 are controlled to match, the output signal 930 is proportional to the absolute temperature of the circuit 900 and of the sensor system 800. In an embodiment, the output PTAT signal 930 is also used as an input 850 to control the currents flowing in the first and second DACs 806, 808 in a manner to be described in greater detail below. The $V_{be}$ threshold voltage of the second bipolar transistor 824 in series combined with the resistor 828 forms an output signal 842 varying complementary to a temperature of the sensor. Essentially, a CTAT voltage signal 842 is generated. An enhanced stable linear CTAT voltage signal is generated because in the embodiment illustrated, a set of twelve (12) parallel diodes is used to generate the CTAT voltage signal. In one example embodiment, a first set of twenty-four (24) parallel grounded emitter PNP transistors 924 is used and further in series with a resistor 928 to generate the CTAT voltage signal 842 as shown.

It is to be appreciated that the set of P-type transistors 936 generate an output 829 that sets the base current through the resistor 834 that in turn sets the base voltage at node 830. In this way, the second DAC 808 in the circuit of the embodiment illustrated in FIG. 8 can be smaller relative to the second DAC 408 illustrated in the circuit of the embodiment of FIG. 4. In the circuit of the embodiment of FIG. 4, the second DAC 408 essentially generates the bias current as a component of the current output signal 428 to be directed to and received at the resistor 434 thereby generating a base voltage signal at node 430. However, in the embodiment shown in FIGS. 8 and 9, the base current is essentially generated in the bandgap circuit of FIG. 9 by the set of P-type transistors 936. This offers numerous advantages including the ability to physically locate the set of P-type transistors 936 in close proximity to the control. P-type transistors 912 and to align the set of P-type transistors 936 with the control P-type transistors 912 in the silicon during fabrication of the circuit as desired, resulting in enhanced analog circuit performance. In the example embodiment illustrated, the set of P-type transistors 936 comprises 244 P-type transistors connected in parallel. The output 829 from this set of devices sets the base current of the circuit 800.

Figure 10:
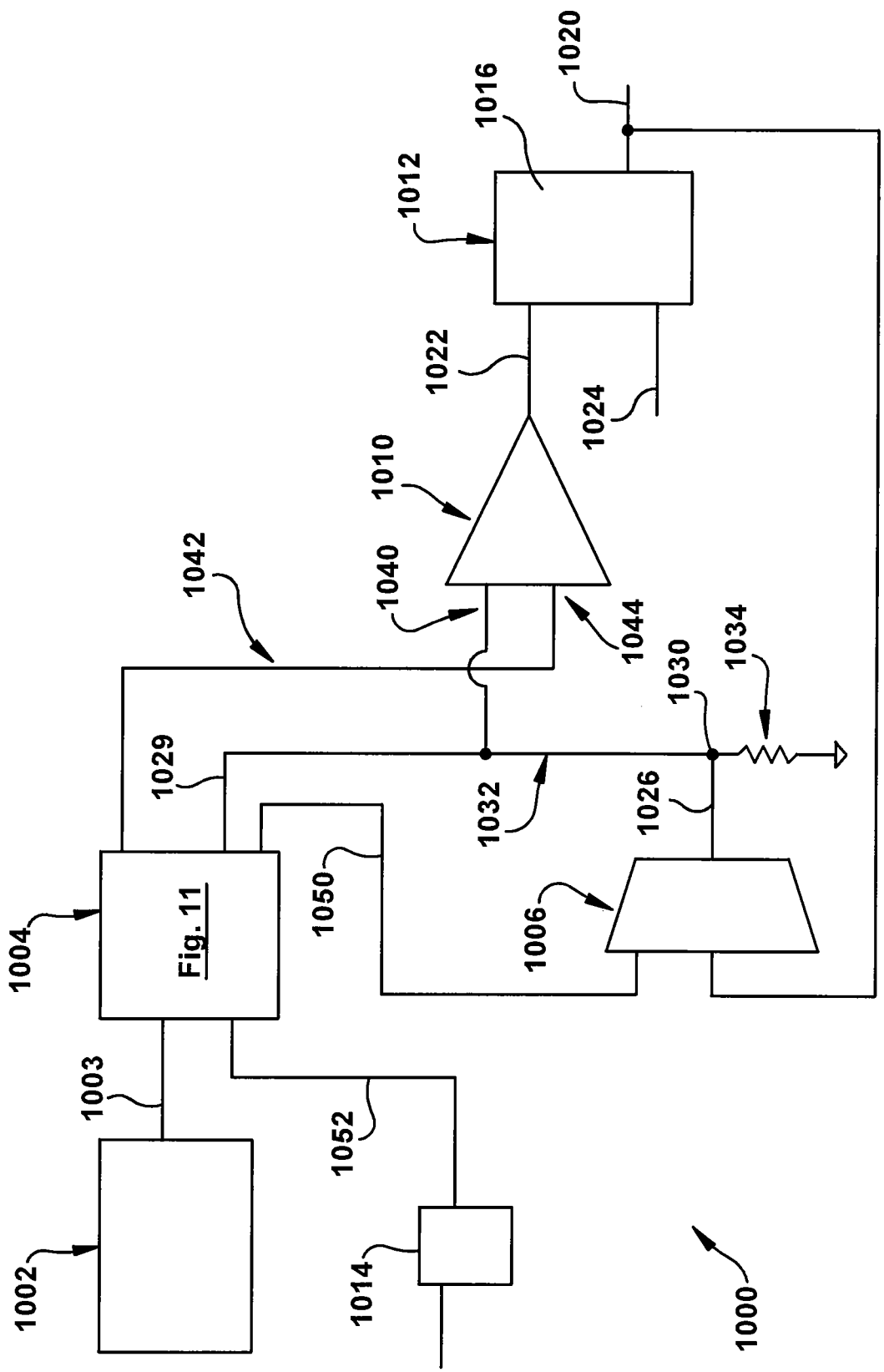
FIG. 10 is a circuit diagram of the temperature sensing system in accordance with a further example embodiment.

FIG. 10 is a circuit diagram showing a digital output temperature sensor circuit 1000 in accordance with a further example embodiment. Turning now to FIG. 10, the sensor circuit 1000 includes a low drop out power supply voltage regulator circuit 1002 generating a power supply voltage signal 1003, a reference voltage generator circuit 1004, a digital to analog converter (DAC) 1006, a comparator circuit 1010, a counter circuit 1012, and a latch circuit 1014. Preferably, the DAC 1006 is an 8-bit converter and is further preferably formed of four (4) 6-bit converters which are identical or at least matched to have complimentary characteristics, behaviors, and function over the operating band.

In the embodiment illustrated, the counter circuit 1012 is preferably an 8 bit up/down counter circuit 1016 configured to generate an 8-bit digital output 1020 based on counting up actions and counting down actions responsive to a pair of inputs received including an input from the comparator circuit 1010 in the form of an up/down command signal 1022 and a clock signal 1024 received into the circuit 1000 from an operatively associated external clock source (not shown). Essentially, the 8-bit digital output 1020 is proportional to the temperature of the circuit. Preferably, the circuit is operable in a temperature range of −30° C. to +135° C. Thus, the resolution of the circuit in the example embodiment is about 0.6° C./LSB.

The 8-bit digital output signal 1020 is configured to provide a digital feedback loop servicing the DAC 1006 for converting the digital feedback 1020 into a current output signal 1026 which is summed at a node 1030. The current output signal 1026 originating from the DAC 1006 is added together with an offset current signal 1029 originating from the reference voltage generator circuit 1004 at the node 1030 whereat the combined currents are converted into a feedback voltage signal 1032 by a grounded resistor 1034. In that way, the feedback voltage signal 1032 may be presented at a first input 1040 of the comparator 1010.

At the digital level of the circuit 1000, a first CTAT low voltage signal 1042a for low (1.5 volt) circuits and a second CTAT high voltage signal 1042b (FIG. 5) for high (2.5 volt) circuits is generated by the reference voltage generator circuit 1004 in a manner to be described in greater detail below. It has been found that, in general, the CTAT low voltage signal 1042a in conjunction with low voltage (1.5 volt) circuit operation offers more precision than the CTAT high voltage signal 1042b in conjunction with high voltage (2.5 volt) circuit operation and, further, is best used with corresponding low voltage DAC 1006 for an overall precise temperature sensing circuit 1000 having high fidelity over a wide usable temperature range. In the example embodiment illustrated, the CTAT low voltage signal 1042a is compared at the second input 1044 of the comparator 1010 with the feedback voltage signal 1032 at the first input 1040 of the comparator 1010. The up/down command signal 1022 is generated based upon the comparison. In its preferred form, the up/down command signal 1022 is a logical "1" when the CTAT voltage signal 1042 is greater than the feedback voltage signal 1032 and is a logical "0" when the CTAT voltage signal 1042 is less than the feedback voltage signal 1032. The counter circuit counts up or down accordingly.

It is to be appreciated, however, that in accordance with an example embodiment, the CTAT voltage signal 1042 is compared against a PTAT reference signal rather than against a fixed reference voltage for improved accuracy and range of operation such as described above. In that regard, the reference voltage generator circuit 1004 is configured to generate a PTAT reference signal 1050 for use by the DAC 1006 during its respective conversions of their digital inputs to current outputs. Essentially, the PTAT reference signal 1050 biases the DAC 1006 to inherently include a temperature dependent characteristic in their respective outputs. The PTAT reference signal 1050 is used to set the current in the DAC 1006 in a manner to be described in greater detail below.

The adjustment latch circuit 1014 also comprises part of the digital feedback loop of the circuit 1000. In its preferred form, the latch is a standard cell Q-latch for latching a digital offset signal 1052 into a corresponding 3-bit DAC (shown in FIG. 11) within the reference voltage generator circuit 1004. The digital offset signal 1052 is converted internally within the reference voltage generator circuit 1004 to a current output signal to be described in greater detail below. Thus, an offset contribution is added to the feedback results at the node 1030 and the combined currents are converted into a feedback voltage signal 1032 by the grounded resistor 1034. In that way, the feedback voltage signal 1032 presented at a first input 1040 of the comparator 1010 may include a user selectable offset value as necessary or desired.

Figure 11:
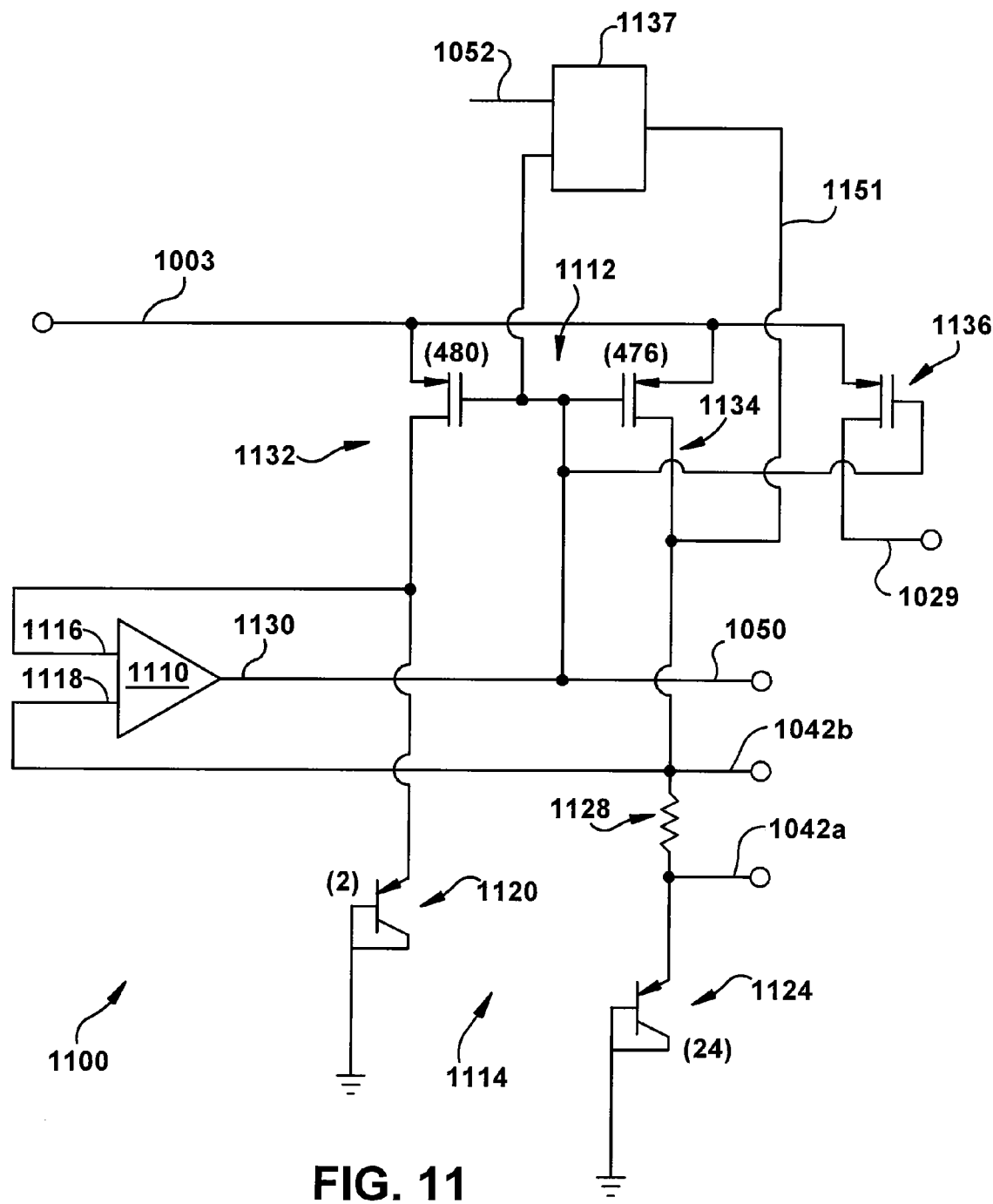
FIG. 11 is a detailed circuit diagram showing components of a portion of the circuit of FIG. 10 in accordance with an example embodiment.

FIG. 11 is a more detailed circuit diagram of the circuit 1004 of FIG. 10 in the form in an example embodiment of a reference voltage generator circuit 1100 configured to generate CTAT voltage signal 1042 for the first input 1044 of the comparator 1010, the additional current bias signal 1029, and the PTAT reference signal 1050 for use by the DAC 1006 in setting its current. The circuit 1100 includes an op amp 1110, a set of control P-type transistors 1112, a set of diode-connected PNP transistors 1114, and a further P-type transistor 1136. In one embodiment, the op amp 1110 is a folded cascade op amp. In addition, the circuit of this example embodiment includes an offset circuit 1137 responsive to the offset signal 1052 received from the latch 1014. In the example embodiment, the diode-connected PNP transistors 1114 are each connected in series between the set of control P-type transistors 1112 and the circuit ground.

In one example embodiment, the circuit operates in a bandgap mode of operation. In that regard, the $V_{be}$ threshold voltage of a first bipolar transistor 1120 is communicated to a first input 1116 of the op amp 1110 and the $V_{be}$ threshold voltage of a second bipolar transistor 1124 combined with the voltage developed across a resistor 1128 is communicated to a second input 1118 of the op amp 1110. The output signal 1130 of the op amp 1110 is communicated to first 1132 and second 1134 current sources formed by the set of control P-type transistors 1112. It is to be appreciated that although the first and second bipolar transistors 1120, 1124 are referred to as single devices, they are, in the example embodiment sets of several physical transistors connected and operating in parallel. In this regard, in the example embodiment, the first bipolar transistor 1120 is a set of two (2) bipolar transistors connected in parallel, each being a single transistor in series between the first current sources 1132 and the circuit ground. Similarly, in the example embodiment, the second bipolar transistor 1124 is a set of twenty-four (24) bipolar transistors connected in parallel, each being a single transistor in series between the second current sources 1134 and the circuit ground.

The op amp 1110 attempts to establish an output wherein the first and second input signals 1116, 1118 are equal by varying the output signal 1130. When the first and second input signals 1116, 1118 are controlled to match, the output signal 1130 is proportional to the absolute temperature of the circuit 1100 and of the sensor system 1000. In an embodiment, the output PTAT signal 1130 is also used as an input 1050 to control the currents flowing in the DAC 1006 in a manner to be described in greater detail below. The $V_{be}$ threshold voltage of the second bipolar transistor 1124 in series combined with the resistor 1128 forms an output signal 1042 varying complementary to a temperature of the sensor. Essentially, a CTAT voltage signal 1042 is generated. An enhanced stable linear CTAT voltage signal is generated because in the embodiment illustrated, a set of twelve (12) parallel diodes is used to generate the CTAT voltage signal. In one example embodiment, a first set of twenty-four (24) parallel grounded emitter PNP transistors 1124 is used and further in series with a resistor 1128 to generate the CTAT voltage signal 1042 as shown.

It is to be appreciated that, similar to the embodiment of FIG. 9, the set of P-type transistors 1136 generate an output 1029 that sets the base current through the resistor 1034 that in turn sets the base voltage at node 1030. In this way, the DAC 1006 in the circuit of the embodiment illustrated in FIG. 10 can be smaller relative to the second DAC 408 illustrated in the circuit of the embodiment of FIG. 4. In the circuit of the embodiment of FIG. 4, the second DAC 408 essentially generates the bias current as a component of the current output signal 428 to be directed to and received at the resistor 434 thereby generating a base voltage signal at node 430. However, in the embodiment shown in FIGS. 10 and 11, the base current is essentially generated in the bandgap circuit of FIG. 11 by the set of P-type transistors 1136. This offers numerous advantages including the ability to physically locate the set of P-type transistors 1136 in close proximity to the control P-type transistors 1112 and to align the set of P-type transistors 1136 with the control P-type transistors 1112 in the silicon during fabrication of the circuit as desired, resulting in enhanced analog circuit performance. In the example embodiment illustrated, the set of P-type transistors 1136 comprises 244 P-type transistors connected in parallel. The output 1029 from this set of devices sets the base current of the circuit 1000.

In addition to the above, it is to be appreciated that in the example embodiment illustrated, the offset DAC 1137 is used to assist in establishing a balance in the bandgap circuit 1100 between the first set of transistors 1132 and the second set of transistors 1134. The first set of transistors 1132 includes 480 devices in the example embodiment and the second set of transistors 1134 includes 476 devices. The 3-bit offset DAC 1137 is used to add offset current to the bandgap circuit 1100 by adding or removing transistors of the DAC 1137 relative to the circuit 1100 in accordance with the offset control signal 1052. In the illustrated embodiment, the 3-bit offset DAC 1136 includes eight (8) current sources that may be selectively switched into and out of operation in the bandgap circuit 1100, thus enabling fine tuned balancing between the first set of transistors 1132 and the second set of transistors 1134 such as may initially result during the fabrication process. It is to be appreciated that a larger offset DAC may be used as necessary or desired in order to cover the range of expected potential mismatch as between the first and second sets of transistors 1132, 1134. Essentially, the offset DAC 1136 is used in this embodiment for bandgap current matching between the first and second sets of transistors 1132, 1134 after fabrication of the subject circuit.

FIG. 12 illustrates a set of curves 1230 representative of the voltages at node 430 over a temperature range for selected output conditions of the DACs 406, 408 in an uncompensated configuration wherein each of the transistor pairs 722 (FIG. 7) are selectively formed having the same length, preferably about 800 nm. A first curve 1232 is representative of the voltage at node 430 over a temperature range of the sensor for an output condition of 000000 for the first DAC 406 and an output of a nominal offset value derived from the second DAC 408. A second curve 1234 is representative of the voltage at node 430 over a temperature range of the sensor for an output condition of 001000 for the first DAC 406 together with the output of the nominal offset value derived from the second DAC 408. Each successive curve 1236-1248 represents the voltage at node 430 over a temperature range of the sensor for output conditions of the first DAC 406 incremented by a plus eight (+8) and including a curve 248 wherein the DAC is set to 111111 together with the output of the nominal offset value derived from the second DAC 408. Although the curves slope to converge at a temperature of absolute zero (not shown), the curves are substantially linear in the operating region of the sensor (−30° C.-135° C.) and, therefore, satisfactory results are obtained. In this embodiment, the spacing between the intercept points between the CTAT signal 104 and the PTAT curves reduces slightly within reasonable limits as temperature increases.

FIG. 13 illustrates a set of curves 1250 representative of the voltages at node 430 of the first embodiment by way of example over a temperature range for selected output conditions of the DACs 406, 408 in a compensated configuration for enhanced linearity wherein each of the transistors of the set of transistors 722 are selectively formed having a different length than each of the other transistors spanning a range of lengths. It is to be appreciated however that the lengths, widths, or lengths and widths may be made to be different and varied In the example embodiment, the set of transistors 722 are selectively formed having different lengths longer or shorter than each of the remaining other transistors. Preferably, the lengths of the transistors are selected during design and fabrication to vary smoothly and without abrupt changes from one operative end of the DACs to the other. In one example, the first transistors 722 have a length of about 1300 nm, and second transistors have a length of about 450 nm. Other transistors have lengths of between about 450 nm to about 1300 nm. A first curve 1252 is representative of the voltage at node 430 over a temperature range of the sensor for an output condition of 000000 for the first DAC 406 and an output of a nominal offset value derived from the second DAC 408. A second curve 1254 is representative of the voltage at node 430 over a temperature range of the sensor for an output condition of 001000 for the first DAC 406 together with the output of the nominal offset value derived from the second DAC 408. Each successive curve 1256-1268 represents the voltage at node 430 over a temperature range of the sensor for output conditions of the first DAC 406 incremented by a plus eight (+8) and including a curve 1268 wherein the DAC is set to 111111 together with the output of the nominal offset value derived from the second DAC 408. The length of the active transistors is about 1300 nm. in the condition of the DAC set at 000000 and the length of the active transistors is about 450 nm. in the condition of the DAC set at 111111 in accordance with address positions of the transistors and their selected lengths (or widths or lengths/widths) during manufacture. In this embodiment, the spacing between the intercept points between the CTAT signal 104 and the PTAT curves remains substantially constant as temperature increases.

Thus, overall, the circuit continuously produces a 6 bit digital code inversely proportional to the temperature of the area of the IC where the temperature sensor is placed. The temperature range covered is from −30 degrees C. to 135 degrees C.

While certain embodiments have been described, these embodiments have been presented by way of example only, and are not intended to limit the scope of the inventions. Indeed, the novel inventions described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A digital output temperature sensor comprising:
a first circuit configured to generate a first signal;
a second circuit configured to generate a proportional to absolute temperature (PTAT) voltage signal, the first circuit comprising: i) a PTAT current control reference voltage generating circuit configured to generate a PTAT current control reference voltage signal; ii) a digital to analog converter circuit including a plurality of current sources receiving the PTAT current control reference voltage signal and being selectively switchable between a conductive state and a non-conductive state and including current source transistors having lengths, widths or lengths and widths, that are varied in size between opposite ends of the digital to analog converter circuit thereby providing linearity of the digital to analog converter circuit over a range of temperatures of the sensor, wherein each of the plurality of current sources in the conductive state sources a partial current; iii) a current summing junction summing each of the plurality of partial currents as a PTAT current signal; and iv) a resistor between the current summing junction and a ground, the resistor being configured to convert the PTAT current signal to the PTAT voltage signal;
a comparator operatively associated with the first and second circuits and configured to receive the first signal and the PTAT voltage signal and generate a comparison signal based on a comparison between the first signal and the PTAT voltage signal; and,
a converter circuit operatively associated with the comparator and configured to receive the comparison signal and generate a digital output signal based on the comparison signal, the digital output signal being representative of the temperature of the sensor;
wherein the first circuit is a reference voltage generator circuit including a single series diode configured to generate a complementary to absolute temperature (CTAT) voltage signal as the first signal;
wherein the converter circuit is configured to receive the comparison signal and generate the digital output signal proportional to the temperature of the sensor.

2. The digital output temperature sensor of claim 1, wherein the single series diode is a set of parallel connected grounded collector PNP transistors.

3. The digital output temperature sensor of claim 1, wherein:
the converter circuit is a counter circuit configured to receive a clock signal and the comparison signal and to generate the digital output signal as a count value proportional to an absolute temperature of the sensor.

4. The digital output temperature sensor of claim 3 wherein:
each of the plurality of current sources is configured to generate PTAT partial currents; and, the current summing junction is configured to sum each of the plurality of partial PTAT currents as the PTAT current signal.

5. The digital output temperature sensor of claim 4 wherein:
the counter circuit is configured to generate a feedback signal in accordance with the digital output signal; and,
the digital to analog circuit of the second circuit is configured to receive the feedback signal from the counter circuit and to generate a feedback partial current for summing together with the plurality of partial currents at the current summing junction.

6. The digital output temperature sensor of claim 5, wherein:
the digital to analog converter circuit comprises first and second parallel digital to analog converter circuits biased by the PTAT current signal, the first digital to analog converter circuit receiving the feedback signal and the second digital to analog converter circuit being adapted to receive an offset signal from an associated offset circuit for setting a balance of the digital output temperature sensor.

7. The digital output temperature sensor of claim 5, wherein the second circuit comprises an offset circuit configured to generate an offset signal at the current summing junction.

8. The digital output temperature sensor of claim 7, wherein the offset circuit comprises a plurality of parallel connected transistors configured to generate a base current in the resistor.

9. The digital output temperature sensor of claim 8, wherein the second circuit comprises a balanced circuit configured to generate a balance signal for balancing an operation of the second circuit.

10. The digital output temperature sensor of claim 9, wherein the balance circuit is a digital to analog converter circuit responsive to a control signal and configured to selectively actuate transistors of the digital to analog circuit for selectively controlling an amount of current added to a first portion of the second circuit for balancing against an inherent imbalance between the first portion of the second circuit and a second portion of the second circuit.

11. The digital output temperature sensor of claim 1, wherein the current source transistors have varied lengths, varied widths, or varied lengths and widths of between about 450 nm. to about 1300 nm.

12. A method in a temperature sensor of sensing a temperature, the method comprising:
generating a first signal;

generating a proportional to absolute temperature (PTAT) current signal by: i) using a PTAT current control reference voltage generating circuit, generating a PTAT current control reference voltage signal; ii) using a digital to analog converter circuit including a plurality of current sources receiving the PTAT current control reference voltage signal and being selectively switchable between a conductive state and the non-conductive state and including current source transistors having lengths, widths or lengths and widths, that vary in size between opposite ends of the digital to analog converter circuit thereby providing linearity of the digital to analog converter circuit over a range of temperatures of the sensor, sourcing a partial current by each of the plurality of current sources in the conductive state; iii) using a current summing junction, summing each of the plurality of partial currents as a PTAT current signal; and iv) using a resistor between the current summing junction and a ground, converting the PTAT current signal to the PTAT voltage signal;

generating a comparison signal based on a comparison between the first signal and the PTAT voltage signal;

generating a digital output signal based on the comparison signal, the digital output signal being representative of the temperature of the sensor;

wherein the generating the first signal includes generating, using a single series diode, a complementary to absolute temperature (CTAT) voltage signal as said first signal;

wherein the generating the digital output signal includes generating the digital output signal proportional to the temperature of the sensor.

13. The method of claim 12 wherein the generating the complementary to absolute temperature (CTAT) voltage signal includes generating the complementary to absolute temperature (CTAT) voltage signal using a set of parallel connected grounded collector PNP transistors.

14. The method of claim 12 wherein:
the generating the digital output signal includes generating, by a counter circuit responsive to a clock signal, the digital output signal as a count value proportional to an absolute temperature of the sensor.

15. The method of claim 14, wherein:
the generating the partial current by each of the plurality of current sources in the conductive state includes generating PTAT partial currents by each of the plurality of current sources in the conductive state; and,
the summing each of the plurality of partial currents as said PTAT current signal using the current summing junction includes summing each of the plurality of partial PTAT currents as said PTAT current signal.

16. The method of claim 15:
wherein the generating the feedback signal comprises generating the feedback signal by a counter circuit configured to generate the feedback signal in accordance with the digital output signal; and,
further comprising receiving the feedback signal from the counter circuit by the digital to analog circuit of the second circuit and generating a feedback partial current for summing together with the plurality of partial currents at the current summing junction.

17. The method of claim 16, comprising:
biasing, by the PTAT current signal, first and second parallel digital to analog converter circuits of the digital to analog converter circuit,
receiving the feedback signal by the first digital to analog converter circuit;
receive an offset signal by the second digital to analog converter circuit from an associated offset circuit; and,
setting a balance of the digital output temperature sensor.

18. The method of claim 16, generating an offset signal at the current summing junction by an offset circuit of the second circuit.

19. The method of claim 18, comprising generating, by a plurality of parallel connected transistors of the offset circuit, a base current in the resistor.

20. The method of claim 19, comprising generating, by a balance circuit of the second circuit, a balance signal for balancing an operation of the second circuit.

21. The method of claim 20, wherein
selectively activating, by a digital to analog converter circuit of the balance circuit responsive to a control signal, selected transistors of the digital to analog circuit for selectively controlling an amount of current added to a first portion of the second circuit for balancing against an inherent imbalance between the first portion of the second circuit and a second portion of the second circuit.

* * * * *